United States Patent [19]
Gribbin et al.

[11] Patent Number: 5,271,970
[45] Date of Patent: Dec. 21, 1993

[54] PROCESS FOR PASSING A HYDROPHOBIC SUBSTRATE THROUGH A CORONA DISCHARGE ZONE AND SIMULTANEOUSLY INTRODUCING AN ADHESIVE PROMOTING AEROSOL

[75] Inventors: John D. Gribbin, Schlangenbad; Lothar Bothe, Mainz; Peter Dinter, Oestrich-Winkel, all of Fed. Rep. of Germany

[73] Assignee: Hoechst Aktiengesellschaft, Fed. Rep. of Germany

[21] Appl. No.: 879,525

[22] Filed: May 4, 1992

Related U.S. Application Data

[60] Continuation of Ser. No. 618,203, Nov. 26, 1990, abandoned, which is a division of Ser. No. 391,210, Aug. 8, 1989, Pat. No. 5,001,002.

[51] Int. Cl.$^5$ .................. B05D 3/06; B05D 5/10
[52] U.S. Cl. .................. 427/569; 427/207.1; 427/255.6; 427/424
[58] Field of Search .......... 427/39, 40, 41, 207.1, 427/255.1, 301, 424, 569, 255.6

[56] References Cited

U.S. PATENT DOCUMENTS

| | | | |
|---|---|---|---|
| 3,274,089 | 9/1966 | Wolinski | 204/169 |
| 4,615,906 | 10/1986 | Kolbe et al. | 427/255.1 |
| 4,649,097 | 3/1987 | Tsukada et al. | 427/40 |
| 4,929,319 | 5/1990 | Dinter et al. | 427/39 |

Primary Examiner—Shrive Beck
Assistant Examiner—Benjamin L. Utech
Attorney, Agent, or Firm—Gregory N. Clements

[57] ABSTRACT

A polymeric sheet structure consists of an adhesion-promoting coating on at least one surface of the substrate. The adhesion-improving coating is produced by treating this substrate surface with an electrical corona discharge between high voltage electrodes and a grounded counter-electrode while simultaneously spraying an aerosol into the corona discharge zone. The aerosol contains, for example, an aqueous emulsion of thermoplastic and/or crosslinkable components as an adhesion-promoting agent.

5 Claims, 1 Drawing Sheet

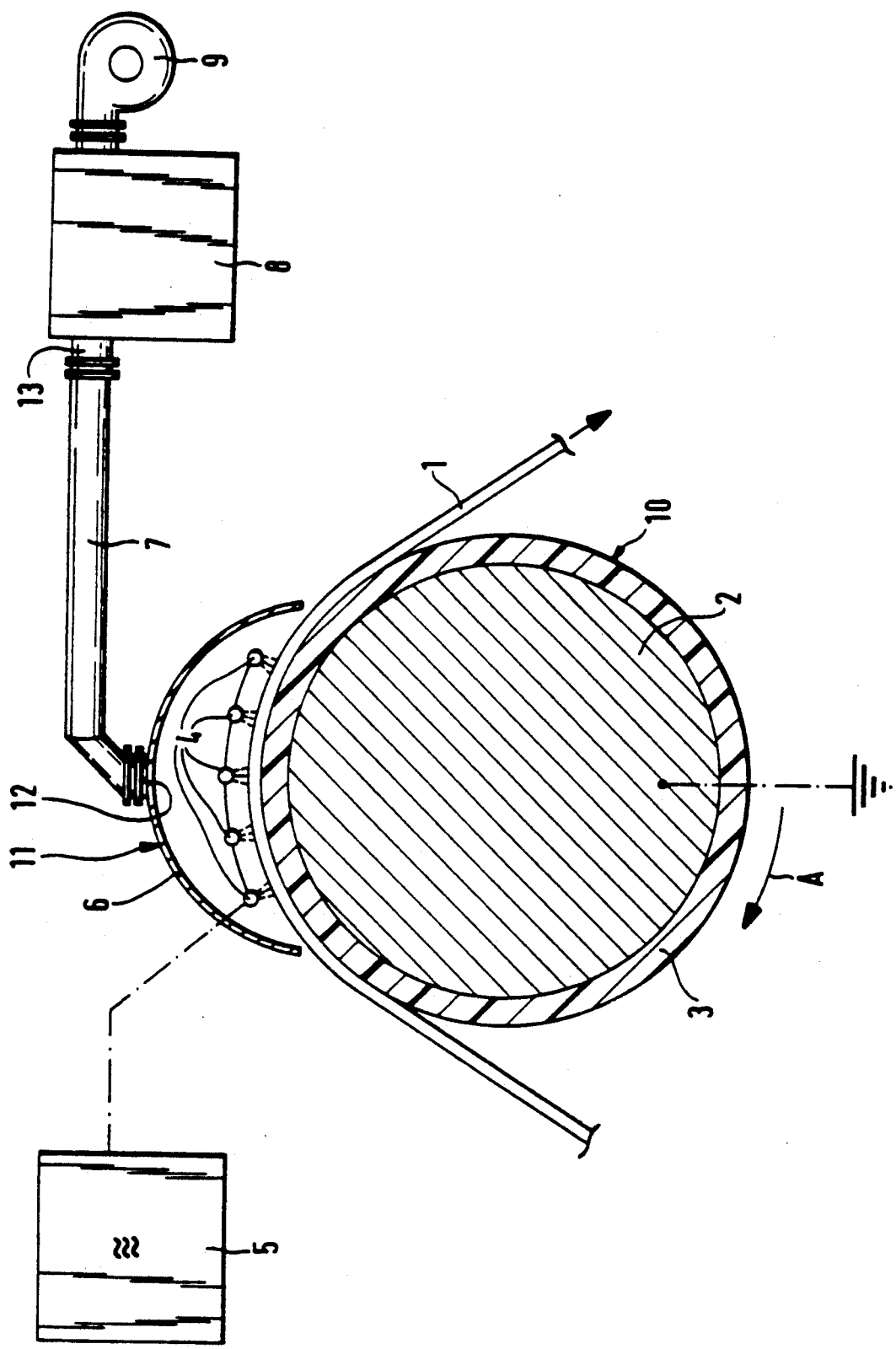

PROCESS FOR PASSING A HYDROPHOBIC SUBSTRATE THROUGH A CORONA DISCHARGE ZONE AND SIMULTANEOUSLY INTRODUCING AN ADHESIVE PROMOTING AEROSOL

This is a continuation of U.S. patent application Ser. No. 07/618,203, filed Nov. 26, 1990, now abandoned, which is a divisional of U.S. patent application Ser. No. 07/391,21 filed Aug. 8, 1989, now U.S. Pat. No. 5,001,002.

BACKGROUND OF THE INVENTION

1) Field Of The Invention

The present invention relates to a sheet-like structure consisting of a substrate and a coating on at least one surface of the substrate, and a process for its production. The coating is applied as an aerosol simultaneously with a corona treatment process to the substrate. The aerosol contains a crosslinkable or non-crosslinkable adhesion promoter to increase the adhesion between the sheet-like structure and a desired coating or printing material.

2) Prior Art

In the case of sheet-like moldings of polymeric materials, for example, films or sheets whose surfaces are generally nonhydrophilic, inadequate adhesive properties during further processing of the polymeric materials by coating or printing lead to undesirable problems. These include partial detachment of the coating from the sheet-like structure and the poor printability of the sheet-like structure.

Oriented films of plastics, in particular biaxially oriented films of polyethylene terephthalate, are used in large amounts as packaging and labeling material for various products, including food.

Since surfaces of films of plastic are generally hydrophobic, they are difficult to coat or print. For many packaging and labeling purposes, however, the films should be capable of accepting normal flexographic and/or gravure printing inks.

In order to remedy this deficiency, special inks which adhere directly to the surface of the films have been developed. However, many of these inks have formulations based on organic solvents, resin-like binders, and other components which are expensive and difficult to process.

Another possibility for improving the printability of plastic films is to apply a primer layer which both adheres to the film and accepts printing inks. Such primer layers consist, for example, of polymer materials based on vinylidene chloride terpolymers, as described in U.S. Pat. No. 2,698,240, or of water-dispersible copolyester primers, as disclosed in U.S. Pat. No. 4,252,885.

It is known that small amounts of sodium alkylsulfates can be added to aqueous dispersions of resin-like substances and these dispersions then applied as primer layers to biaxially oriented polyester films. The sulfates serve as emulsifiers or wetting agents for the intended uses described in, for example, U.S. Pat. No. 2,627,088.

However, none of these prior publications is concerned with the problem of improving the adhesion of plastic films or with solving this problem by the procedure described here.

SUMMARY OF THE INVENTION

It is the object of the present invention to provide sheet-like structures, such as films, sheets, woven fabrics and the like, having surfaces which exhibit good adhesion and capability of accepting coatings and/or prints.

This object is achieved, according to the invention, if the coating consists of an adhesion-promoting layer on at least one surface of the substrate, which layer is formed with the aid of an electrical corona discharge which takes place between a high voltage electrode and a grounded counter-electrode, and an aerosol which contains a crosslinkable or noncrosslinkable agent as an adhesion promoter. The aerosol is introduced into the corona discharge zone during the corona discharge.

BRIEF DESCRIPTION OF THE DRAWING

The single figure drawing is a part schematic part cross-sectional view of the aerosol/corona treatment apparatus.

DESCRIPTION OF THE PREFERRED EMBODIMENTS

For the purposes of the present invention, it is possible in principle to use, for the substrate, all materials which have the difficulties stated previously, i.e., hydrophobic materials having poor adhering surfaces, in particular polymers in the form of films, such as biaxially oriented polyester or polypropylene films, or sheets.

Examples of polymers having some or all of the above difficulties are, in particular, polymer films of natural and synthetic polymers, such as cellulose, cellulose esters, polyvinyl chloride, polystyrene, styrene copolymers with butadiene, polycarbonate, polymers and copolymers of olefins, such as ethylene, propylene, butylene, methylpentene, etc., polysulfone, aliphatic and aromatic polyesters, polyimides, polyisobutylene, polymethyl methacrylate, polyphenylene sulfide, polyurethane, polyamide, polyaryl ether ketone, polyaryl ether ether ketone, polyaryl ether sulfone, polyamidoimide, polyetherimide, etc. (cf. Ullmanns Enzyklopädie der Technischen Chemie, Verlag Chemie, Weinheim, 4th revised and extended edition (1976), page 673 et seq.; Encyclopedia of Polymer Science and Eng., Vol. 7, John Wiley & Sons (1973), page 73 et seq.). The production of self-supporting, oriented or non-oriented films from the stated polymers is carried out by various known technologies, which are likewise described in the literature cited. The term self-supporting film is intended to include both monofilms consisting of one layer and multilayer films consisting of a plurality of layers of identical or different polymer materials, or laminates containing layers of plastics and of nonplastics, such as, for example, paper or metal.

The adhesion-promoting coating on the substrate is formed by the action of an electrical corona discharge in the presence of an aerosol on the substrate surface. The corona discharge triggers and promotes reaction mechanisms which result in chemical surface modification of the treated substrate. A possible explanation for this is that, as a result of the corona discharge, the aerosol or the agents contained therein is or are firmly anchored to the substrate surface. Furthermore, the corona discharge has an advantageous effect on the crosslinking of the components present in the aerosol.

For the corona discharge, an alternating current voltage between 5,000 and 25,000 V is applied to the high voltage electrode by means of a high voltage generator. The alternating current voltage between the high voltage electrode and the grounded counter-electrode is proportional to the transport velocity at which the substrate to be treated moves through the corona discharge zone, i.e., at a higher transport velocity the alternating current voltage is in the upper range, while at lower transport velocities the medium range of 5,000 to 18,000 V is set in order to achieve a constant effect.

The aerosols are prepared with the aid of known two-material atomizing nozzles or by means of piezoelectric ultrasonic atomizing systems. The aerosols are used in the form of emulsions, dispersions or solutions of low molecular weight and/or high molecular weigh materials, which are introduced, in solvents and dispersants, such as, for example, in water, into the corona discharge zone.

A process for the treatment of the surfaces of plastics substrates by means of corona discharge with simultaneous spraying with an aerosol, and an arrangement for carrying out this process, have been described in every detail in German Offenlegungsschrift P 37 05 482 1, which is equivalent to U.S. Pat. No. 4,929,319, issued May 29, 1976.

Examples of adhesion-promoting agents are aqueous dispersions containing acrylate, copolyester, polyurethane or polyvinylidene chloride copolymers, or such dispersions which contain thermoplastic and/or cross-linkable components.

The amount of adhesion-promoting agent to be applied can be varied within wide limits and is matched with the particular application.

In the process according to the invention, the adhesion-promoting agents are first dispersed, emulsified or dissolved in a solvent or dispersant, with an aqueous solvent or dispersant preferably being used. The solvent or dispersant with the adhesion-promoting agent is then sprayed, together with a carrier gas, into the corona discharge zone as an aerosol. The dispersions or emulsions generally contain from 0.1 to 10 percent by weight, based on the total weight of the dispersion liquid or emulsion liquid, of adhesives. It may be advantageous to increase the temperature of the dispersants to improve the dispersibility or emulsifiability.

In general, air is used as the carrier gas for the aerosol, but it is also possible to use nitrogen or another inert gas, for example a noble gas. Particularly advantageous anchoring effects can be achieved with reactive gases, such as, for example, halogens, carbon dioxide, ammonia or formaldehyde, mixed with inert gases if necessary.

In the process according to the invention, the coating can be applied to the substrate off-line after the substrate has been produced; this applies in particular when papers or sheet-like substrates are to be coated. The coating can also be applied in-line, during the process for the production of the substrate. It is known that, for example, biaxially oriented films of thermoplastics are produced by extrusion of a melt and subsequent biaxial orientation, followed by heat setting. In this procedure, the coating can be applied before, between or after the individual stretching steps which take place in sequence, or before or after a simultaneous stretching process, or before or after the heat setting. In the case of woven fabrics, the coating can be applied to the fibers themselves during their production or to the woven fabric produced.

Because of the special application process, the coating has particularly good adhesion to the substrate surface. The layer thickness of the coating corresponds to a weight per unit area of substrate in the region of only 1 to 100 mg/m$^2$.

The sheet-like structures according to the invention are suitable for those applications where good adhesive properties are desirable. These include, for example, the use of packaging films or films for technical applications, such as adhesive tapes, magnetic tape films, capacitor dielectrics or substrate films for reprographic or photographic applications.

The invention is illustrated in more detail below with reference to the single Figure, which shows an aerosol/corona apparatus for the treatment of polymer films The apparatus consists of a generator 5, which is connected to a corona discharge apparatus 11. The generator 5 applies a high-frequency alternating current at high voltage to the high voltage discharge electrodes 4 of the corona discharge apparatus 11. The metal core 2 of a roller 10 having a circumferential polymeric coating 3 serves as the grounded counter-electrode. A self-supporting polymer web 1 to be coated is transported over the roller 10. A housing 6 encloses the discharge electrodes 4 of the corona discharge apparatus 11 and is connected via a line 7, for example a pipe or a flexible tube, to an atomizing apparatus 8, in which an aqueous liquid is atomized to give a suspendable aerosol by means of a two-material atomizing nozzle or a piezoelectric ultrasonic system. A blower 9 is connected to the atomizing apparatus and conveys the carrier gas, for example air, for the aerosol through the atomizing apparatus into the corona discharge apparatus 11. The line 7 is connected to a pipe socket 13 of the atomizing apparatus 8 and to a pipe socket 12 of the housing 6.

EXPERIMENTAL CONDITIONS

Unless stated otherwise, the transport velocity of the self-supporting polymer films was 20 m/min. The corona power in each case is 1,000 W, corresponding to a voltage setting of 5,500 V.

The adhesive properties of the surface are determined by solid printing with a nitrocellulose printing ink (MRHH-23 from Siegwerk), applied by the reverse gravure roll method. The printed surface is then coated with a conventional laminating adhesive and laminated with a 50 micron thick polyethylene (PE) film. After curing of the adhesive for 10 days at room temperature, the bond strength is determined by cutting out 15 mm wide strips from the laminate and pulling apart the two films, i.e., the adhesive-coated substrate and the polyethylene film, in a tensile test apparatus at an angle of 180° in the peeling test. The force required for this purpose and the fracture point of the laminate are noted in each case.

The laminates are stored for five minutes in boiling water, i.e., at 100° C., and their boiling resistance is then determined in the same way.

To form a substrate, a polyethylene terephthalate (PET) raw material was melted and formed by means of a slot die into a film, which is quenched to give an amorphous preliminary film on a cooled roller polished to a high gloss and having a surface temperature of 20° C. The preliminary film was then stretched longitudinally at 95° C. and stretched in the transverse direction at 110° C., the stretching ratio per unit area being about 13. The 50 micron thick film was then heat set at a temperature of 230° C. The film thus produced was treated as follows:

EXAMPLE 1

The heat-set film was exposed to a corona treatment and a simultaneous aerosol treatment with an aqueous polyvinylidene chloride (PVdC) dispersion (solids content 5 percent, Diofan N610 from BASF) by the process according to the invention. The coating thickness was about 20 mg per meter squared of polyethylene terephthalate film.

EXAMPLE 2

Example 1 was repeated using a PVdC dispersion having a solids content of 8 percent. The coating thickness was about 30 mg per square meter of film.

EXAMPLE 3

Example 1 was repeated using an acrylate dispersion consisting of about 55 mole percent methyl methacrylate, about 40 mole percent ethyl acrylate and about 5 mole percent methacrylamide, which are then mixed in a ratio of 4 : 1 with a crosslinking agent consisting of melamine/formaldehyde. The coating thickness was about 15 mg per square meter of film.

EXAMPLE 4

Starting from the substrate used in Example 1, the corona treatment and simultaneous aerosol treatment was carried out with a copolyester dispersion, the copolyester consisting of about 45 mole percent isophthalic acid, about 5 mole percent 5-sulfoisophthalic acid, about 50 mole percent alkylene glycol by weight. The coating thickness was about 20 mg per square meter of film.

EXAMPLE 5

The substrate of Example 1 was subjected to a corona discharge and a simultaneous aerosol treatment with a dispersion of a copolyester consisting of about 36 mole percent terephthalic acid, about 10 mole percent adipic acid, about 4 mole percent 5-sulfoisophthalic acid, about 50 mole percent ethylene glycol. The coating thickness was about 20 mg per square meter of film.

COMPARATIVE EXAMPLE VB 1

The heat-set film described in the Experimental Conditions was subjected to neither a corona treatment nor an aerosol treatment. The bond strength between the ink and film was only 1/6 to 1/11 of the value for the PET films provided with an adhesion-promoting coating.

COMPARATIVE EXAMPLE VB 2

The heat-set film was subjected to a corona treatment without an aerosol treatment. The bond strength between the ink and film was about 0.31 to 0.61 times the value for the films treated according to the invention.

COMPARATIVE EXAMPLE VB 3

The heat-set film was subjected to a corona treatment and a subsequent aerosol treatment (not simultaneous with corona treatment) with the copolyester dispersion of Example 4. Although the bond strength was higher than in the case of Comparative Examples 1 and 2, it was only about 0.6 times the value of the bond strength for the film treated according to the invention in Example 4.

All three Comparative Examples VB 1 to VB 3 had no adhesion after storage in boiling water and undergo delamination in water.

The results of the measurements of the bond strength and of the adhesion after storage in boiling water for the Examples according to the invention and the Comparative Examples are summarized in the Table below.

TABLE 1

| Example No. | Bond Strength N/15 mm | Parting Point | Adhesion After Storage In Boiling Water N/15 mm | Parting Point |
| --- | --- | --- | --- | --- |
| 1 | 3.5 | Loss of cohesion in the ink | 0.2 | Between ink and PET |
| 2 | 1.8 | Between ink and PET | 0.2 | Between ink and PET |
| 3 | 1.8 | Loss of cohesion in the ink | 0.2 | Between ink and PET |
| 4 | 2.3 | Loss of cohesion in the ink | 0.5 | Loss of cohesion in the ink |
| 5 | 2.4 | Loss of cohesion in the ink | 0.6 | Loss of cohesion in the ink |
| VB 1 | 0.3 | Between ink and PET | 0 (delaminates in water) | Between ink and PET |
| VB 2 | 1.1 | Between ink and PET | 0 (delaminates in water) | Between ink and PET |
| VB 3 | 1.4 | Loss of cohesion in the ink | 0 (delaminates in water) | Between ink and PET |

The loss of cohesion in the ink means that the ink layer is split and ink adheres both to the PET film and to the PE film.
If the parting point is located between the ink and the PET film, the adhesion of the ink layer to the PET film is insufficient.

That which is claimed is:

1. A process for forming a polymeric sheet structure having surfaces which exhibit good adhesion, printability, and capability of accepting coatings, comprising: forming a polymeric sheet structure; corona treating said polymeric sheet structure; and coating said structure simultaneously during said corona treatment by means of an aerosol, said aerosol comprising a carrier gas and a dispersant, said dispersant comprising a solvent and an effective amount of a crosslinkable or non-crosslinkable agent as an adhesion promoter, said dispersion containing from 0.1 to 10% by weight of said adhesion promoter, based on the total weight of said dispersion, said constant applied to said structure at a range of from 1 to 100 mg per square meter of said structure, wherein said aerosol is introduced into said corona treatment with an atomizer selected from either a two-material atomizing nozzle or a piezoelectric ultrasonic atomizing system.

2. A process as claimed in claim 1, wherein said coating step comprises moving said structure through said corona treatment, the transport velocity at which said structure to be treated moves through said corona treatment is proportional to the level of the alternating current voltage at which the corona treatment is operated.

3. A process as claimed in claim 1, wherein said carrier gas is selected from the group consisting of air, nitrogen, and a noble gas.

4. A process as claimed in 1, wherein said carrier gas is selected from the group consisting of halogen, carbon dioxide, ammonia, and formaldehyde, and a mixture of such gases with gases selected from the group consistent of air, nitrogen, and a noble gas.

5. The process of claim 1, wherein said adhesion promoter includes at least one of an acrylate, a copolyester, a polyurethane or polyvinylidene chloride.

* * * * *